United States Patent
Druihle et al.

(10) Patent No.: US 11,380,102 B2
(45) Date of Patent: Jul. 5, 2022

(54) METHOD FOR VIDEO SURVEILLANCE OF THE CROSSING OF A LINE BY PEOPLE, ASSOCIATED COMPUTER PROGRAM AND DEVICE

(71) Applicant: BULL SAS, Les Clayes-sous-Bois (FR)

(72) Inventors: Rémi Druihle, Saint-Martin-d'Hères (FR); Cécile Boukamel-Donnou, Échirolles (FR); Benoit Pelletier, Saint-Étienne-de-Crossey (FR)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 16/934,430

(22) Filed: Jul. 21, 2020

(65) Prior Publication Data
US 2021/0027067 A1 Jan. 28, 2021

(30) Foreign Application Priority Data

Jul. 22, 2019 (FR) ...................... 1908293

(51) Int. Cl.
*G06K 9/00* (2022.01)
*G06V 20/40* (2022.01)
*G06V 40/10* (2022.01)

(52) U.S. Cl.
CPC .............. *G06V 20/46* (2022.01); *G06V 20/41* (2022.01); *G06V 20/49* (2022.01); *G06V 40/103* (2022.01); *G06V 2201/07* (2022.01)

(58) Field of Classification Search
CPC ........... G06K 9/00744; G06K 9/00369; G06K 9/00718; G06K 9/00765; G06K 2209/21;
(Continued)

(56) References Cited

U.S. PATENT DOCUMENTS 6,545,705 B1  4/2003  Sigel et al.
2017/0236029 A1* 8/2017  Howell .................. G06K 9/627
                                                            382/159
(Continued)

FOREIGN PATENT DOCUMENTS

WO   WO 2010/075430 A1   7/2010

OTHER PUBLICATIONS

Search Report as issued in French Patent Application No. 1908293, dated May 15, 2020.
(Continued)

*Primary Examiner* — Dhaval V Patel
(74) *Attorney, Agent, or Firm* — Arc IP Law, PC; Joseph J. Mayo

(57) ABSTRACT

The method includes for each of a plurality of successive images of a video stream from a camera, the search for at least one person present in the image and the definition, for each person found, of a zone in the image, known as person zone, surrounding this person at least partially; for each of at least one person, the grouping together into one tracklet of several person zones from successive images and surrounding this same person at least partially; for each tracklet: the identification of the person in this tracklet from person zones, the determination of a moment at which the line is crossed by the person identified from person zones and the addition of the name found and of the moment of crossing determined in at least some of the images containing the person zones.

10 Claims, 11 Drawing Sheets

Figure 1:
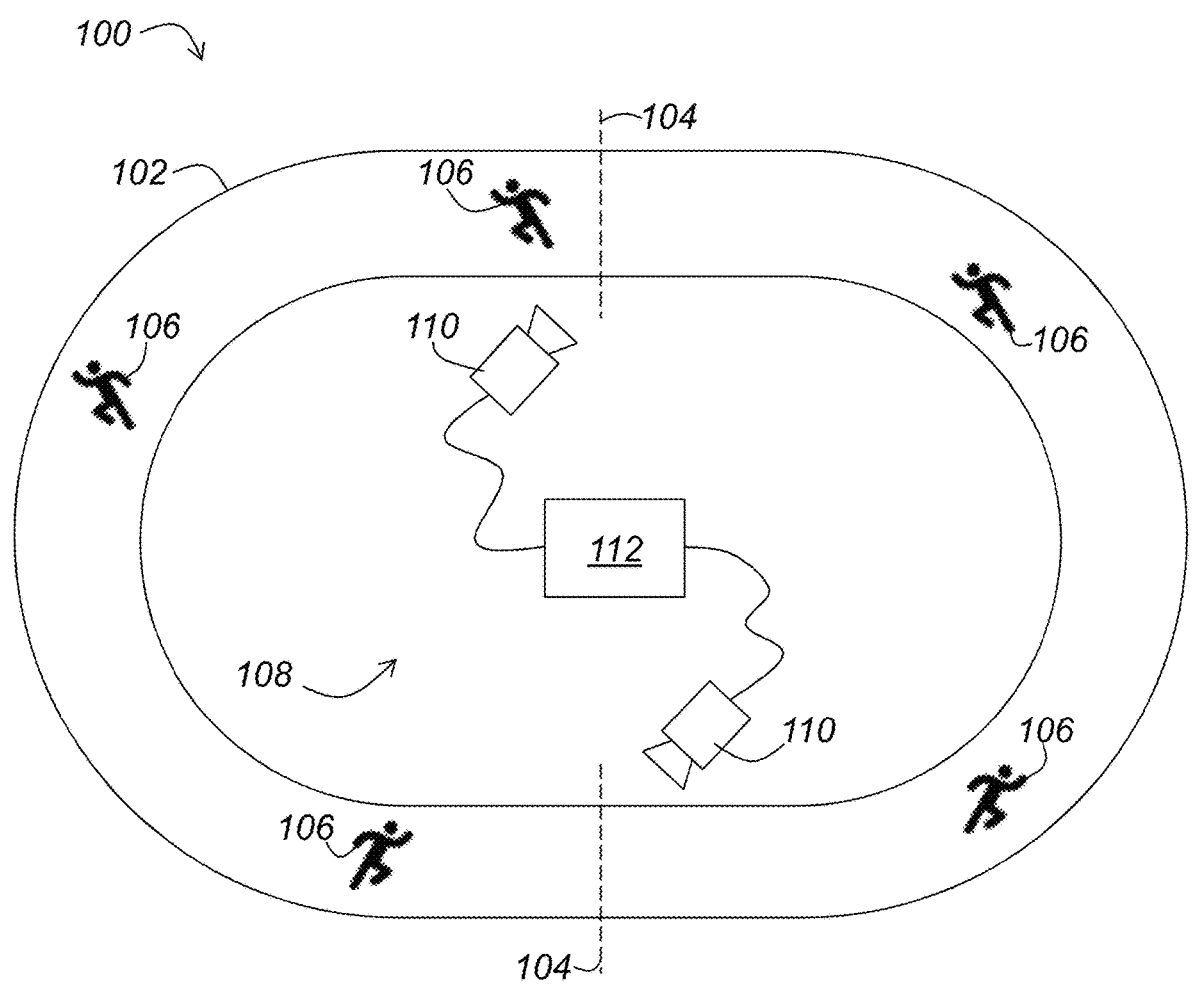

(58) Field of Classification Search
CPC ............. G06K 9/4628; G06K 9/00724; G06K 9/3258; G06K 2209/01
See application file for complete search history.

(56) References Cited

U.S. PATENT DOCUMENTS

| | | | |
|---|---|---|---|
| 2018/0107877 A1* | 4/2018 | Inaba | G06K 9/00677 |
| 2020/0074156 A1* | 3/2020 | Janumpally | G06K 9/00255 |
| 2020/0193201 A1* | 6/2020 | Liu | G06K 9/6215 |
| 2021/0089841 A1* | 3/2021 | Mithun | G06K 9/4604 |

OTHER PUBLICATIONS

Bazzani, L., et al., "Symmetry-driven accumulation of local features for human characterization and re-identification," Computer Vision and Image Understanding, Vo. 117, No. 2, Feb. 2013, XP055694983, pp. 130-144.

Kamlesh, P. X., et al., "Person Re-Identification with End-to-End Scene Text Recognition," CCCV 2017: Chinese Conference on Computer Vision, Jan. 2017, XP009520187, pp. 363,374.

Wibowo, P. T., et al., "Automatic Running Event Visualization using Video form Multiple Camera," Retrieved from the Internet: URL:https://pdfs.semanticscholar.org/36c0/07c340c3215b64f505fc7567a92174e9ae39.pdf, XP055692764, Jun. 2019, pp. 1-37.

* cited by examiner

METHOD FOR VIDEO SURVEILLANCE OF THE CROSSING OF A LINE BY PEOPLE, ASSOCIATED COMPUTER PROGRAM AND DEVICE

CROSS-REFERENCE TO RELATED APPLICATIONS

This application claims the benefit of French Patent Application No. 1908293, filed Jul. 22, 2019, the disclosure of which is herein incorporated by reference in its entirety.

The present invention relates to a method for the video surveillance of the crossing of a line by people, as well as associated computer program and device.

The invention applies for example to the identification of participants in a sporting activity, such as a foot or cycling race.

The international PCT application published under number WO 2010/075430 A1 describes a method for person identification in a video, and more specifically in an image of this video. More specifically, document WO 2010/075430 A1 proposes to use the visual signature when it is not possible to recognize a number worn by the person. Thus, it is proposed to compare the visual signature of the current image with the visual signature of another image of the person, in which an identification number worn by the person has been previously recognized.

Moreover, US patent application published under the number US 2018/0107877 A1 describes a method for person identification in a plurality of images. More specifically, document US 2018/0107877 A1 proposes to use the visual signature when it is not possible, in some of the plurality of images, to recognize a number worn by the person. Thus, it is proposed to compare the visual signature of each of these images with the visual signature of another image of the plurality, in which an identification number worn by the person has been recognized.

However, none of these documents proposes a solution for the video surveillance of the crossing of a line by people.

It may thus be desirable to provide a method for the video surveillance of the crossing of a line by people.

Therefore the object of the invention is a method for the video surveillance of the crossing of a line by people, characterized in that it comprises:
- for each of a plurality of successive images of a video stream from a camera pointing towards the line, the search for at least one person present in the image and the definition, for each person found, of a zone in the image, known as a person zone, surrounding this person at least partially;
- for each of at least one person found, the grouping together into one tracklet of several person zones from successive images and surrounding this same person at least partially;
- for each tracklet:
  the identification of the person in the tracklet based on person zones in the tracklet;
  the determination of a moment at which the line is crossed by the person identified from the person zones in the tracklet; and
  the addition of the name found and of the moment of crossing determined in at least some of the images containing the person zones in the tracklet.

Thus, thanks to the invention, the same person zones are used both to determine the moment at which the line is crossed, as well as the identity of the person crossing it. This synergy makes it possible to simplify the calculations and to make them quicker, which facilitates real-time video surveillance.

Optionally, identification of the person comprises:
- for each person zone in the tracklet, the determination of a visual signature of the person, known as local visual signature;
- the determination of an aggregate visual signature of the person from local visual signatures;
- the search for an identification number in the person zones;
- if the identification number is not found, the search, from identification numbers each associated with one or more reference visual signatures, for that for which the visual signature or signatures associated has the smallest distance with the aggregate visual signature; and
- if the identification number is found, the association of the aggregate visual signature with this identification number, in order to become a reference visual signature.

Also optionally, the aggregate visual signature is an average of the local visual signatures.

Also optionally, the method further comprises, for each determination of a local visual signature, the assessment of the reliability of this local visual signature and the aggregate visual signature is determined from, in addition to local visual signatures, their associated reliabilities.

Also optionally, the distance of the aggregate visual signature to several reference visual signatures is an average of the respective distances between the aggregate visual signature and the reference visual signatures.

Also optionally, searching for the identification number comprises:
- for each person zone in the tracklet, the search for at least one number present in the person zone and the definition, in the person zone, for each number found, of a zone, known as a number zone, surrounding this number;
- for each number zone in the tracklet, recognition of the number present in the number zone and, for each number recognized, the assessment of the reliability of the recognition;
- selecting one of the numbers recognized from the reliabilities of these recognized numbers; and
- searching for the selected number among predefined identification numbers.

Also optionally, the selection of one of the recognized numbers from the reliabilities associated with these numbers comprises:
- filtering each number for which the reliability is below a predefined threshold; and
- selecting one of the other numbers, known as reliable numbers, from their associated reliabilities.

Also optionally, the determination of the moment of crossing comprises:
- the determination, from the person zones in the tracklet, of that zone first crossing, in a predefined direction, a line with a fixed and predefined position in the images; and
- the determination of a moment at which the line is crossed from a moment associated with the image containing the person zone crossing the line first.

A computer program, downloadable from a communication network and/or recorded on a medium readable by a computer and/or executable by a processor, is also proposed, characterized in that it comprises instructions for executing the steps of a method according to the invention, when said program is executed on a computer.

A device for the video surveillance of the crossing of a line by persons is also proposed, characterized in that it comprises:

means designed, for each of a plurality of successive images of a video stream from a camera pointing towards the line, to search for at least one person present in the image and to define, for each person found, a zone of the image, known as a person zone, surrounding this person at least partially;

means designed, for each of at least one person found, to group together into one tracklet several person zones from successive images and surrounding this same person at least partially;

means designed, for each tracklet, to identify the person in the tracklet based on person zones in the tracklet;

means designed, for each tracklet, to determine a moment at which the line is crossed by the person identified from the person zones in the tracklet; and means designed, for each tracklet, to add the name found and the moment of crossing determined in at least some of the images containing the person zones in the tracklet.

Figure 2:
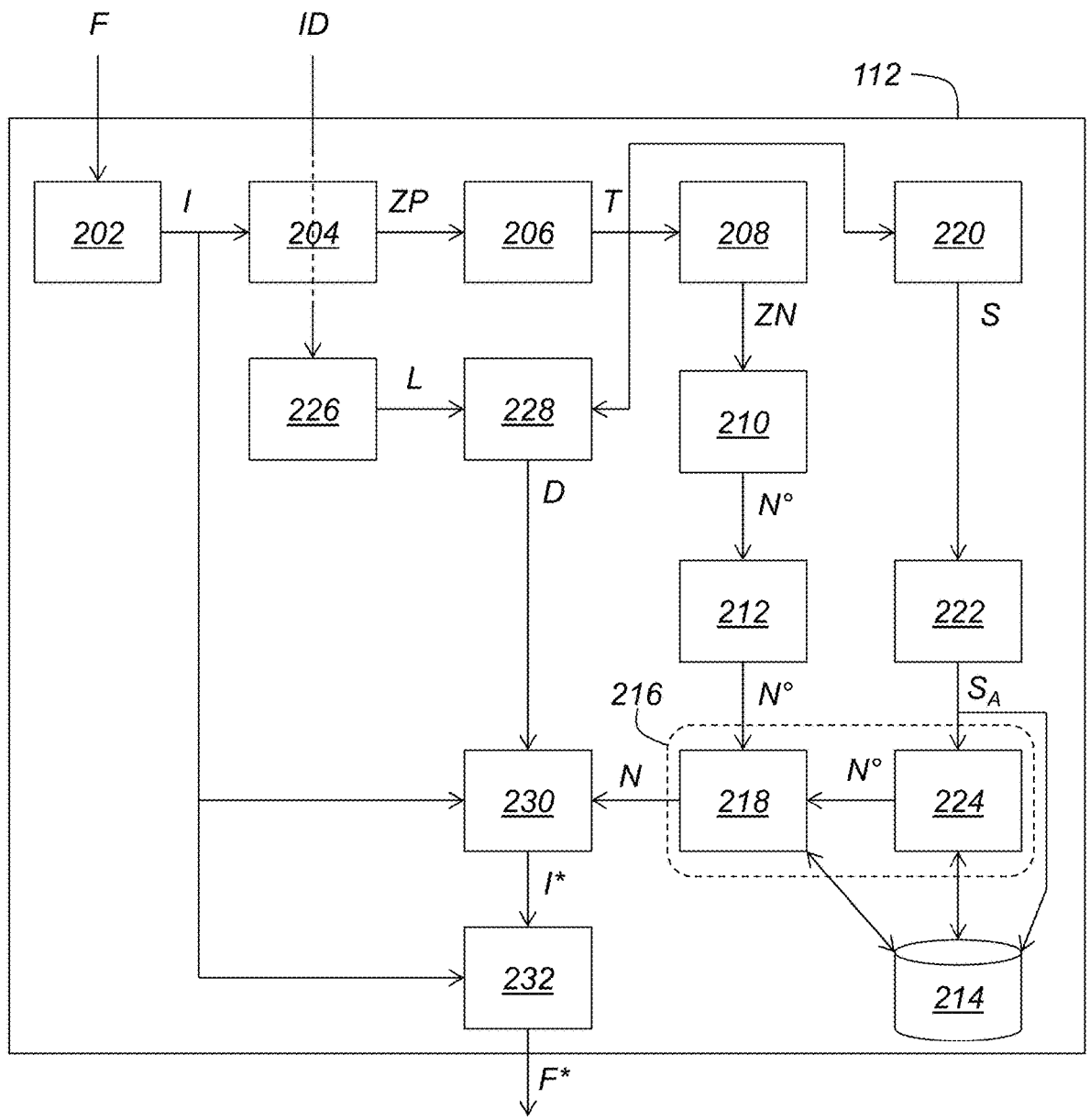
Figure 3:
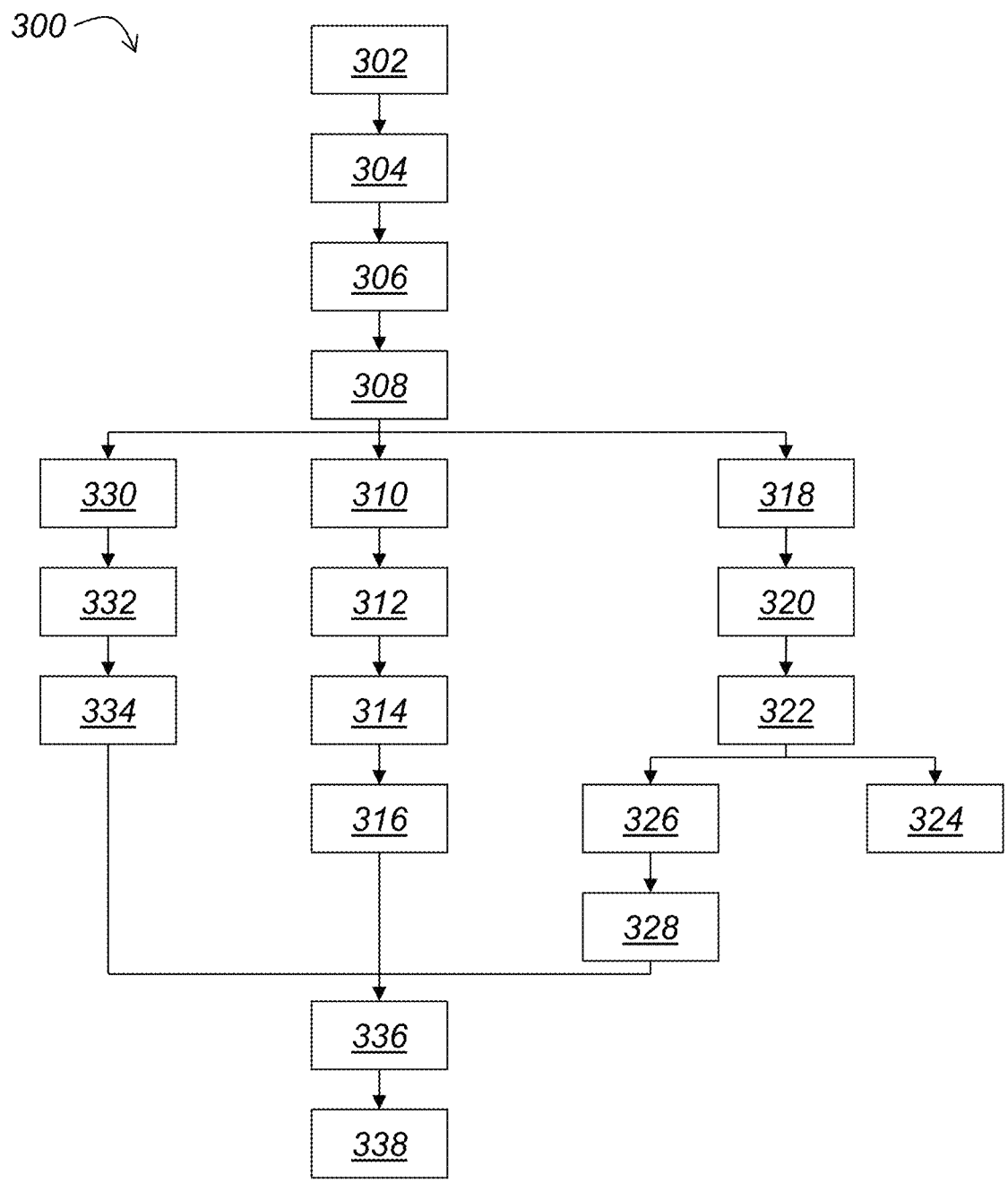
Figure 4:
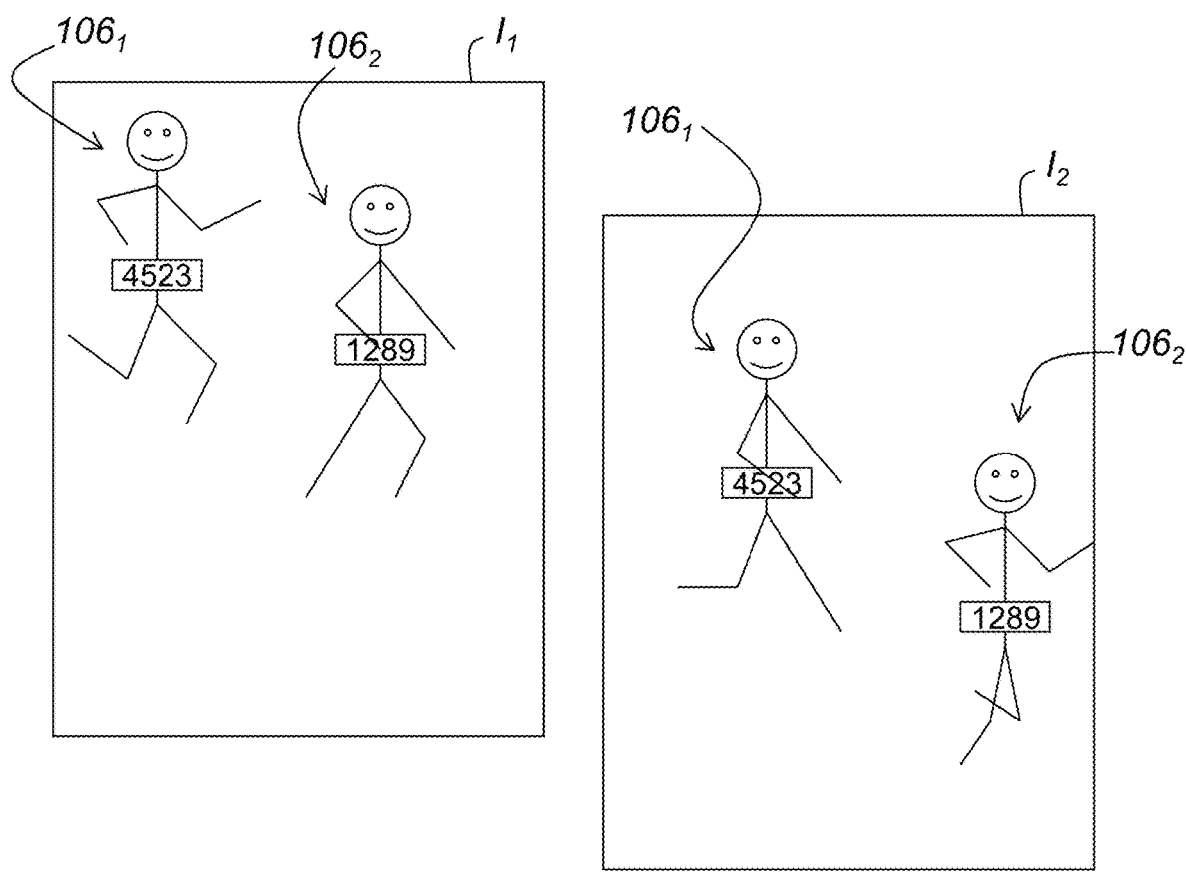
Figure 5:
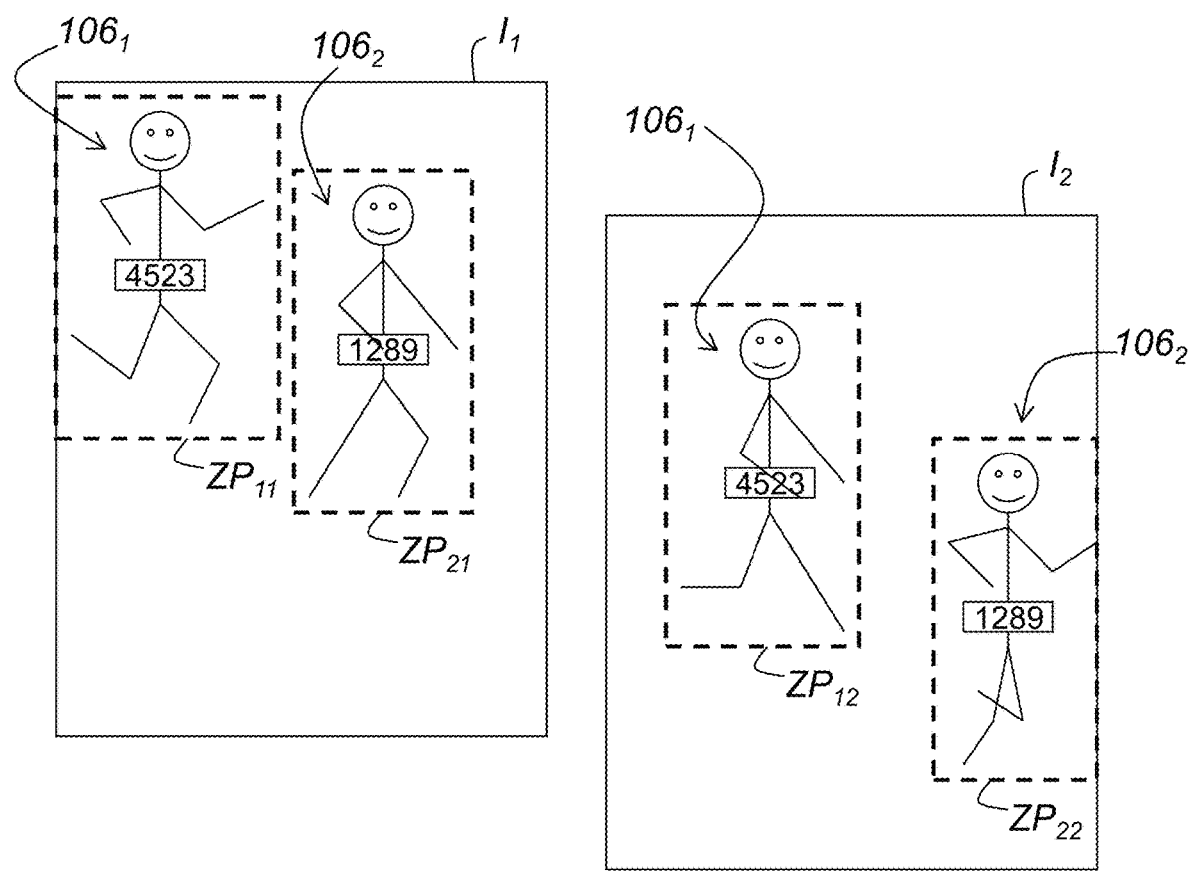
Figure 6:
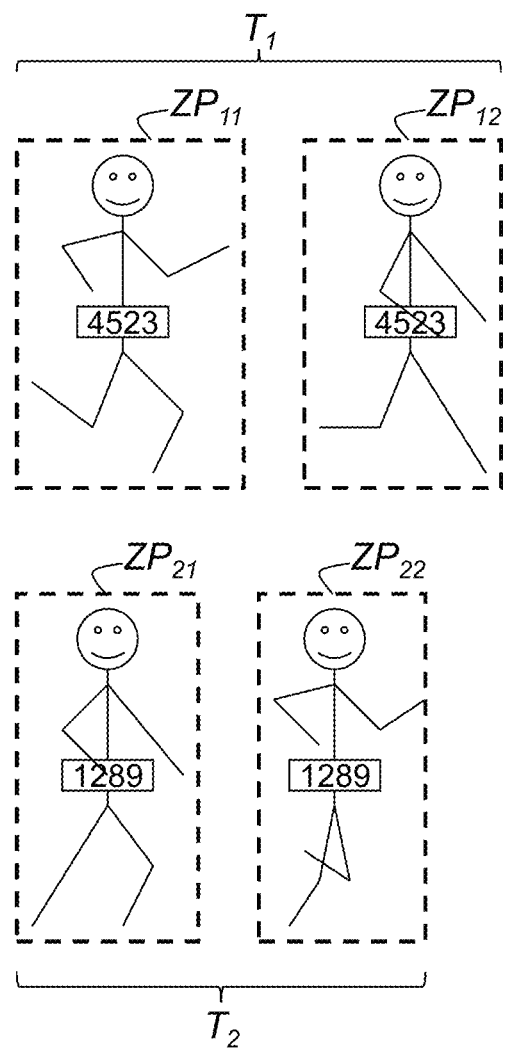
Figure 7:
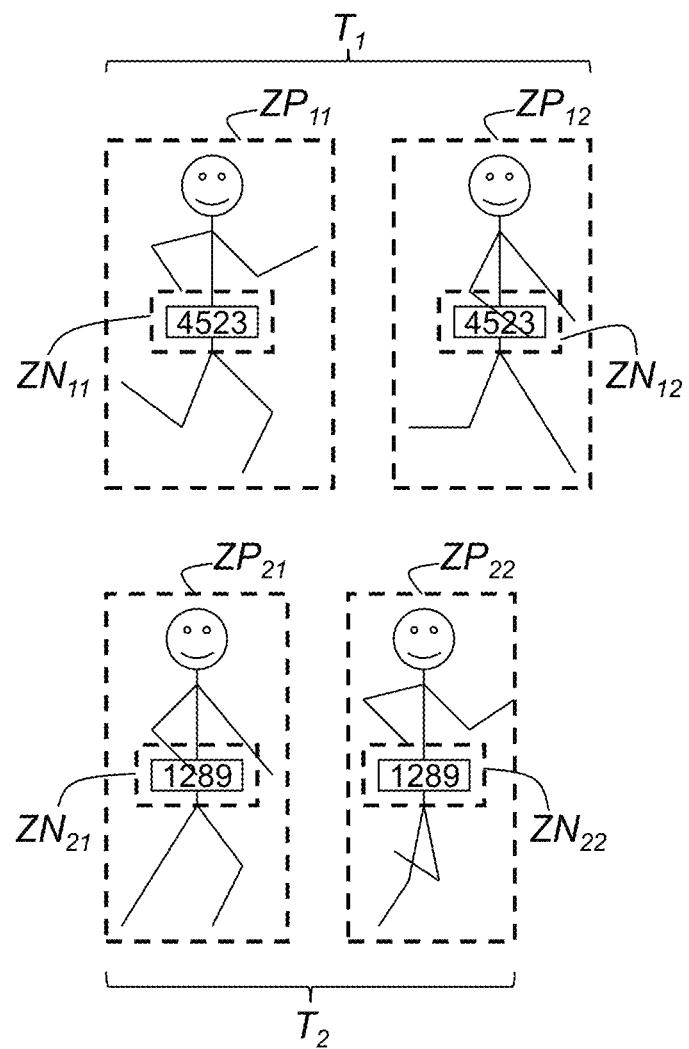
Figure 8:
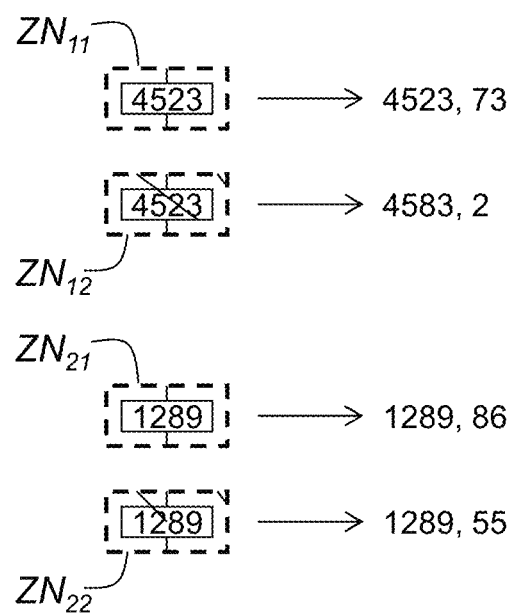
Figure 9:
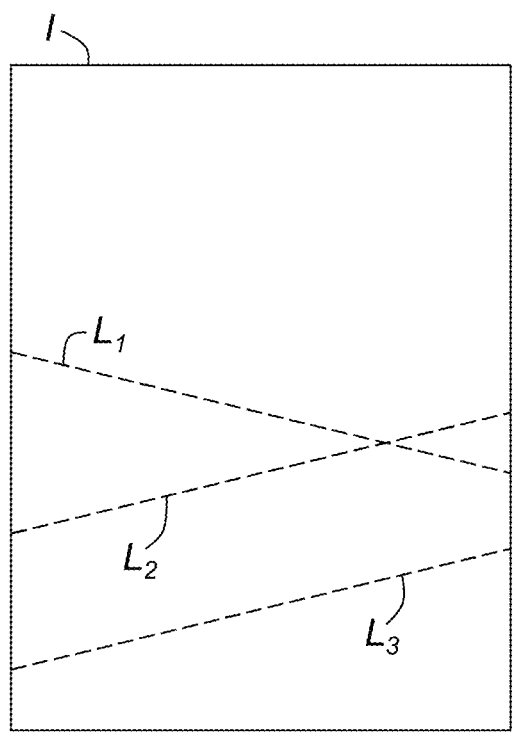
Figure 10:
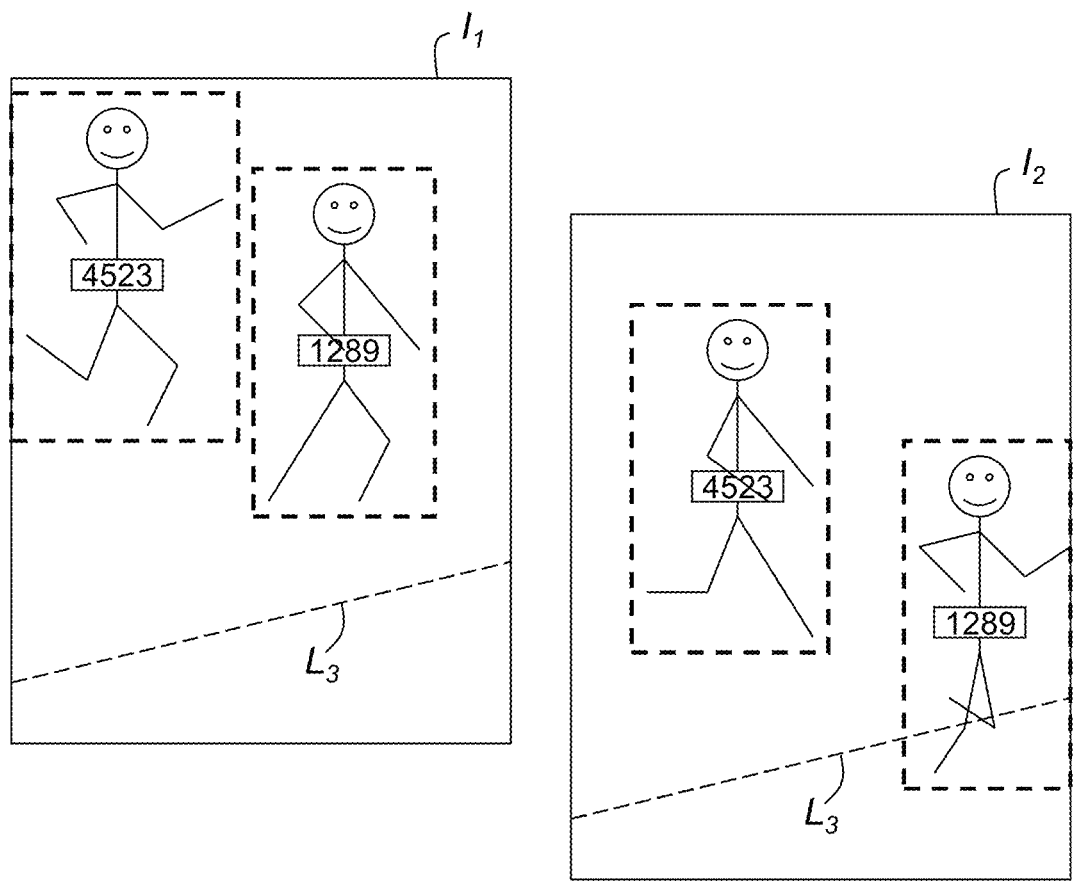
Figure 11:
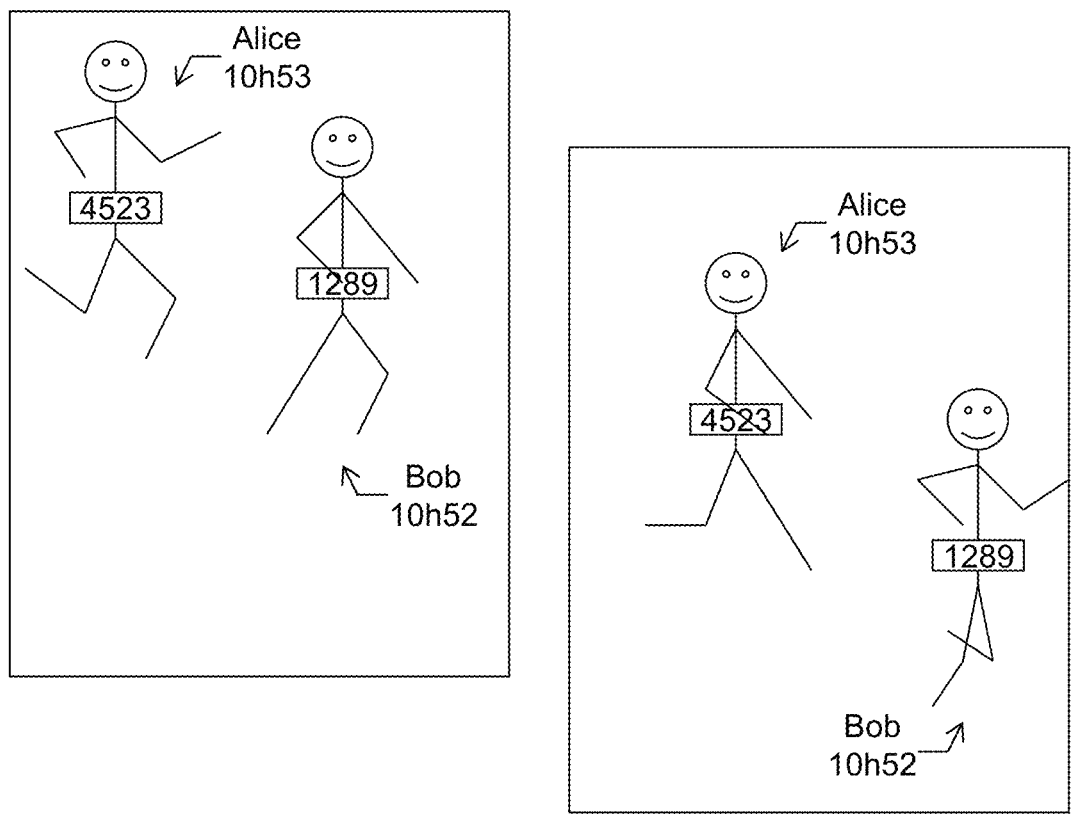

The invention will be better understood by means of the following description, given only as an example and made with reference to the attached drawings wherein:

FIG. 1 schematically represents the general structure of a foot race infrastructure in which the invention is implemented, FIG. 2 schematically represents the general structure of a device for person identification in the infrastructure of FIG. 1, FIG. 3 shows the successive steps of a method for person identification, according to an embodiment of the invention, FIG. 4 represents two consecutive images of a video stream from a camera of the infrastructure of FIG. 1, FIG. 5 represents person zones defined in the two images of FIG. 4, FIG. 6 represents tracklets obtained from the person zones of FIG. 5, FIG. 7 represents number zones defined in the person zones of FIG. 6, FIG. 8 represents the recognition results of numbers present in the number zones of FIG. 7, FIG. 9 represents different lines of division of the images, FIG. 10 shows the determination of a person zone crossing one of the lines of FIG. 9 having been selected, and FIG. 11 shows the two images of FIG. 4 after modification.

Referring to FIG. 1, a foot race infrastructure 100 implementing the invention will now be described.

The infrastructure 100 firstly comprises a route 102 designed to be covered by participants 106 in a race, for example a foot race. One of more crossing lines 104 are distributed along the route 102 so as to be crossed by the participants 106, for example in order to obtain intermediate progression times during the race. Each crossing line 104 is fixed, i.e. it is always positioned in the same location along the route 102, at least for the duration of the race. Moreover, each crossing line 104 may be virtual, i.e. it may not be marked on the route 102. Each crossing line 104 is for example a straight line.

The infrastructure 100 further comprises a system 108 for detecting participants 106 in the race.

The system 108 firstly comprises one or more cameras 110 positioned along the route 102 so as to respectively point towards the crossing line or lines 104, in order to detect the crossing of participants 106 and thus monitor their progression in the race. Thus, each camera 110 is associated with a respective crossing line 104. The camera or cameras 110 are preferably fixed, like the crossing line or lines 104. Preferably, each camera is positioned at height, for example between two and three meters high, and angled towards the participants, in order to be able to recognize them.

The system 108 further comprises a device 112 for the video surveillance of the crossing of a line by people. The device 112 is connected to each camera 110, by a wired or wireless communication network. The device 112 is for example a computer, preferably equipped with one or more graphics cards and connected by Ethernet to the cameras 110. This computer does not require an Internet connection.

In its simplest version, the system 108 comprises a single camera pointing towards a single crossing line 104. The latter may be crossed several times by the participants, thus making it possible to collect several intermediate times at different milestones along the race. In this case, the route 102 must be closed (in a loop or figure-of-eight) and covered several times by the participants, so that they pass the crossing line 104 several times.

A more advanced version includes the installation of a high-speed wireless network between, on the one hand, the cameras 110, distributed over several crossing lines, and, on the other hand, the computer responsible for processing the data. The data is then transferred via a high-speed long-range wireless network such as WiMAX (~10-30 km) or using long-range WiFi technologies (~2-10 km).

Referring to FIG. 2, the device 112 will now be described in more detail.

The device 112 firstly comprises video conversion means 202 designed to receive the video stream F from each camera 110 and to convert this video stream F into a series of successive images I. The images I are respectively associated with the moments (date and/or time) at which they were converted. Each video stream F is for example in RTSP (Real Time Streaming Protocol) format.

The device 112 further comprises means for locating a person 204 designed, for each of the successive images I of the video stream F of each camera 110, to search for at least one person present in the image I and to define, in the image I, for each person found, a zone, known as a person zone ZP, surrounding this person at least partially. Each person zone ZP thus has a certain position in the image I. In the example described, each person zone ZP is a rectangular box surrounding the person and the position of this box in the image I is for example defined by the position of one of its corners. In the example described, the means for locating a person 204 comprise a neural network, for example a convolutional neural network with a Single Shot Multibox Detector or SSD. In the example described, the neural network has been previously trained to detect several targets, for example: pedestrian, two-wheeled vehicles, cars, trucks, other. Within the scope of the present invention, only the detection of pedestrians is used.

The device 112 further comprises means for constructing tracklets 206 designed, for each of at least one person found, to group together, into one tracklet, several person zones ZP from successive images I and surrounding the same person at least partially.

The device 112 further comprises means designed, for each tracklet T, to identify the person in this tracklet T from person zones ZP in this tracklet T. These means comprise the following means 208 to 224.

Thus, the device 112 comprises number locating means 208 (Rib Number Detection or RBN Detection) designed, for each person zone ZP in the tracklet T, to search for at least one number present in the person zone ZP and to define, in the person zone ZP, for each number found, a zone, known as a number zone ZN, surrounding this number. In the example described, the number zone ZN is a rectangular box surrounding the number. In the present invention, the term "number" encompasses any series of characters and is therefore not limited only to series of digits. In the example described, the number locating means 208 comprise a neural network, for example a Deep Neural Network or DNN, trained beforehand to perform the tasks above. For example, the neural network is that described in the SSD-tensorflow project with the hyperparameters of the following Table 1:

TABLE 1

CUDA_VISIBLE_DEVICES=0,1,2,3 setsid python Textbox_train.py \
--train_dir=${TRAIN_DIR} \
--dataset_dir=${DATASET_DIR} \
--save_summaries_secs=60 \
--save_interval_secs=1800 \
--weight_decay=0.0005 \
--optimizer=momentum \
--learning_rate=0.001 \
--batch_size=8 \
--num_samples=800000 \
--gpu_memory_fraction=0.95 \
--max_number_of_steps=500000 \
--use_batch=False \
--num_clones=4 \

The device 112 further comprises number recognition means 210 (Rib Number Recognition or RBN Recognition) designed, for each number zone ZN in the tracklet T, to recognize the number N° present in the number zone ZN. The number recognition means 210 are further designed, for each number N° recognized, to assess a reliability (also called "confidence") of the recognition. In the example described, the number recognition means 210 comprise a neural network, for example a deep neural network, trained beforehand to perform the previous tasks. For example, the neural network is that of the CRNN_Tensorflow model as described in the article by Baoguang Shi et al. entitled "An End-to-End Trainable Neural Network for Image-based Sequence Recognition and Its Application to Scene Text Recognition" and published on Jul. 21, 2015 on arXiv.org (https://arxiv.org/abs/1507.05717).

The device 112 further comprises number selection means 212 designed to select one of the numbers N° recognized from the reliabilities of these recognized numbers N°.

In the example described, the number selection means 212 are firstly designed to filter each number N° for which the reliability is below a predefined threshold. Thus, only the numbers N° with a reliability above the threshold, known as reliable numbers, are retained. The number selection means 212 are further designed to select one of the reliable numbers N° from their associated reliabilities. Regarding the latter selection, the number selection means 212 are for example designed to determine, from the values of the reliable numbers N°, the one for which a combination, such as the sum or even the average, of the reliabilities of the numbers having this value is the highest. The number N° selected by the number selection means 212 is then the one having this determined value.

The device 112 further comprises a database 214 comprising a set of predefined identification numbers identifying respective people. For example, in this database 214, names N of participants 106 in the race are respectively associated with identification numbers. An example database 214 is illustrated in the following table:

TABLE 2

| Name (N) | Identification number |
|---|---|
| Alice | 4523 |
| Bob | 1289 |

The database 214 may further associate with each person (Name/N°) one or more reference visual signatures $S_R$ representative of the visual appearance of this person. These reference visual signatures $S_R$ may be recorded in the database 214 before the race and supplemented by other reference visual signatures $S_R$ during the race, as will be explained below.

The device 112 further comprises name recovery means 216 comprising a first module 218 designed to search, among the identification numbers predefined in the database 214, for the number N° selected by the number selection means 212 and to recover the associated name N.

The device 112 further comprises visual signature determination means 220 designed, for each person zone ZP in each tracklet T, to determine what is known as a local, visual signature S, of the person present in the person zone ZP and to assess a reliability (or "confidence") of each local visual signature S. The local visual signature S of the person is representative of his or her overall visual appearance (which includes for example: the body type of the person, the shape and the color of their clothing, etc.). In the example described, the visual signature determination means 220 comprise a neural network, for example a deep neural network, trained beforehand to perform the previous tasks. For example, the neural network is the ResNet network 50. Preferably, the neural network is trained beforehand from images of people in at least some of which the face of the person is not visible. Thus, the neural network successfully learns to recognize a person on the basis of their overall visual appearance, and not from the visual appearance of their face.

The device 112 further comprises means for determining an aggregate visual signature 222 designed, for each tracklet T, to determine an aggregate visual signature $S_A$ from local visual signatures S of the person in the person zones ZP in the tracklet T and their associated reliabilities. For example, the aggregate visual signature $S_A$ is an average of the local visual signatures S of the person in the person zones ZP of the tracklet T, weighted by the respective reliabilities of these local visual signatures S.

The means for determining the aggregate visual signature 222 are further designed to verify whether it has been possible to identify the person in the tracklet T by an identification number worn by this person, by the means previously described.

In this case, the means for determining an aggregate visual signature 222 are further designed to record the aggregate visual signature $S_A$ in the database 214 and to associate it with the identification number found (and therefore also with the name N associated with this identification number). The aggregate visual signature $S_A$ thus becomes a reference signature $S_R$ for the person having this name N and identified by this identification number.

Otherwise, particularly if the reliabilities of the numbers N° assessed by the number recognition means 210 are all below the predefined threshold for the number selection means 212, the means for determining the aggregate visual signature 222 are designed to supply this aggregate signature $S_A$ to the name recovery means 216. Indeed, the latter comprise, in addition to the first module 218, a second module 224 designed to determine, in the database 214, the identification number associated with one or more reference visual signatures $S_R$ having a distance (for example, a Euclidean distance) in relation to the aggregate visual signature $S_A$ below a predefined threshold. The second module 214 is further designed to record the aggregate visual signature $S_A$ in the database 214 and to associate it with the identification number found (and therefore also with name N associated with this identification number). The aggregate visual signature $S_A$ thus becomes a reference signature $S_R$ for the person having this name N and identified by this identification number. The second module 224 is further designed to supply the identification number determined to the first module 218, so that the latter recovers the name N associated with this identification number.

The device 112 further comprises line selection means 226 designed to receive, with each video stream F received, an identifier ID of the camera 110 sending this video stream F and to select a line L representing the crossing line 104 associated with the camera 110 having this camera identifier ID. Each line L has a fixed and predefined position in the images I provided by this camera 110. The lines L are for example straight lines and/or divide each image I into two: an upstream part via which the participants 106 in the race are intended to arrive in the images I and a downstream part via which the participants 106 are intended to leave the images I.

The device 112 further comprises crossing detection means 228 designed firstly to determine, for each tracklet T, from the person zones ZP in the tracklet T, the zone first crossing, in a predefined direction, the line L selected by the line selection means 226. For example, when the line L divides each image I into two parts, the crossing detection means 228 are designed, for each tracklet T, to determine the person zone ZP extending at least partly into the downstream part, whereas all the previous person zones ZP extended into the upstream part.

The crossing detection means 228 are further designed to determine a moment D at which the line L is crossed from a moment associated with the image I containing the person zone ZP crossing the line first. This moment of crossing D is for example the conversion moment associated with each image by the video conversion means 202.

The device 112 further comprises image modification means 230 designed to add the name N provided by the name recovery means 216 and the moment of crossing D provided by the crossing detection means 228 in at least part of the images I containing the person zones ZP forming the tracklet T from which this name N and this moment of crossing D have been determined. This information N, D is for example added to the images I so as to obtain modified images I* in which the information N, D follows the person zone ZP. This makes it possible to implement augmented reality.

The device 112 further comprises video stream reconstruction means 232 designed to construct a reconstructed video stream F* from images I* modified by the image modification means 230 and from unmodified images I from the original video stream F (for example for the moments when no participant 106 is passing in front of the camera 110).

Referring to FIGS. 3 to 11, a method 300 for the video surveillance of the crossing of each crossing line 104 will now be described. During this description, a concrete example will be developed, for which certain results are illustrated in FIGS. 4 to 11.

During a step 302, each camera 110 provides a video stream F to the device 112.

During a step 304, the video conversion means 202 receive the video stream F from each camera 110 and convert this video stream F into a series of successive images I. The video conversion means 202 further associate the images I with the respective moments at which they were converted.

Referring to FIG. 4, in the example developed, two successive images $I_1$, $I_2$ obtained from the step 304 are illustrated. Two participants 1061, 1062 in the race are visible on these images $I_1$, $I_2$.

Back to FIG. 3, during a step 306, for each of the images I of the video stream from each camera 110, the means for locating a person 204 search for at least one person present in the image I and define, in the image I, for each person found, a person zone ZP surrounding this person at least partially. Thus, each person zone ZP defines, on the one hand, a sub-image (the content of the person zone ZP, i.e. the part of the image I contained in the person zone ZP) and occupies, on the other hand, a certain place in the image I (in particular a position in the image).

The result of the step 306 in the example developed is shown in FIG. 5. More specifically, for the image I1, the means for locating a person 204 detect the first participant 1061 and define the participant zone $ZP_{11}$ around him or her. Moreover, the means for locating a person 204 detect the second participant 1062 and define the participant zone $ZP_{12}$ around him or her. The same occurs for the image I2, giving rise to the participant zone $ZP_{21}$ surrounding the first participant 1061 and to the participant zone $ZP_{22}$ surrounding the second participant 1062.

Back to FIG. 3, during a step 308, for each of at least one person found, the means for constructing tracklets 206 group together, into one tracklet T, several person zones ZP from successive images I and surrounding the same person at least partially.

The result of step 308 in the example developed is illustrated in FIG. 6. More specifically, the means for constructing tracklets 206 supply a first tracklet $T_1$ grouping together the participant zones $ZP_{11}$, $ZP_{12}$ surrounding the first participant 1061 and a second tracklet $T_2$ grouping together the person zones $ZP_{21}$, $ZP_{22}$ surrounding the second participant 1062.

Back to FIG. 3, the following steps 310 to 328 are implemented for each tracklet T, to identify the person in this tracklet T from person zones ZP in this tracklet T.

During a step 310, for each person zone ZP in the tracklet T, the number locating means 208 search for at least one number N° present in the person zone ZP, and more specifically in the content of this person zone ZP, and define, in the person zone ZP, for each number N° found, a number zone ZN surrounding this number N°.

The result of step 310 in the example developed is shown in FIG. 7. More specifically, for the tracklet $T_1$, the number locating means 208 detect a number in each person zone $ZP_{11}$, $ZP_{12}$ and define, in respectively these two person zones $ZP_{11}$, $ZP_{12}$, the number zones $ZN_{11}$, $ZN_{12}$. Similarly, for the tracklet $T_2$, the number locating means 208 detect a number in each person zone $ZP_{21}$, $ZP_{22}$ and define, in respectively these two person zones $ZP_{21}$, $ZP_{22}$, the number zones $ZN_{21}$, $ZN_{22}$.

Back to FIG. 3, during a step 312, for each number zone ZN in the tracklet T, the number recognition means 210 recognize the number N° present in the number zone ZN and assess the reliability of the recognition.

The result of step 312 in the example developed is shown in FIG. 8. More specifically, for the tracklet $T_1$, the number recognition means 210 recognize the number 4523 in the number zone $ZN_{11}$ with a reliability of 73, and the number 4583 in the number zone $ZN_{12}$ with a reliability of 2. For the tracklet $T_2$, the number recognition means 210 recognize the number 1289 in the number zone $ZN_{11}$, with a reliability of 86 and the number 1289 in the number zone $ZN_{22}$, with a reliability of 55.

Back to FIG. 3, during a step 314, the number selection means 212 select one of the numbers N° recognized from the reliabilities associated with these recognized numbers N°.

In the example developed, in which pre-filtering is intended, the predefined threshold for filtering the numbers is 5. Thus, for the tracklet $T_1$, the number 4583 in the number zone $ZN_{12}$ has a reliability below the predefined threshold and is therefore filtered by the number selection means 212. All that remains is the number 4523 in the number zone $ZN_{11}$ which is therefore selected by the number selection means 212. For the tracklet $T_2$, the two numbers 1289 in the number zones $ZN_{21}$, $ZN_{22}$ are reliable and are therefore not filtered by the number selection means 212. These two numbers moreover have the same value, 1289. Thus, the number selection means 212 combine the reliabilities of these two numbers, for example by taking their average, which is 70.5. To show an example of selecting from several different numbers, it is assumed that the tracklet $T_1$ further comprises the two images preceding the images $I_1$, $I_2$, that these two images also contain the second participant 1062, and that these two images respectively result in the following two number predictions: 7289 with a reliability of 70 and 7289 with a reliability of 50. The combination (average in the example described) of the reliabilities of the numbers having the value 7289 is therefore 60. Thus, in this example, the value 1289 is the one for which the combination of the reliabilities of numbers having this value is the highest and the number 1289 is therefore selected by the number selection means 212.

During a step 316, the name recovery means 216 search, among the identification numbers predefined in the database 214, for the number N° selected in the step 314 and recover the associated name N.

In parallel to steps 310 to 316, the following steps 318 to 328 are implemented.

During a step 318, for each person zone ZP in the tracklet T, the visual signature determination means 220 determine, from the content of this person zone ZP, a local visual signature S of the person present in the person zone ZP and associate each local visual signature S with a reliability.

During a step 320, the means for determining the aggregate visual signature 222 determine an aggregate visual signature $S_A$ from local visual signatures S of the person in the person zones ZP of the tracklet T and of their associated reliabilities.

During a step 322, the means for determining the aggregate visual signature 222 verify whether it has been possible to identify the person in the tracklet T by a number worn by this person. For example, the means for determining the aggregate visual signature 222 verify whether it has been possible to select a number N° in the step 314 and/or whether one of the identification numbers in the database 214 has been found in step 316, making it possible to recover a name N.

If this is the case, during a step 324, the means for determining the aggregate visual signature 222 record the aggregate visual signature $S_A$ in the database 214 and associate it with the name of the person N (and with the associated number N°) recovered by the name recovery means 216. The aggregate visual signature $S_A$ then becomes a reference visual signature $S_R$ representing the person having the name N, and supplementing the reference visual signatures already present in the database 214, for example those recorded before the race or indeed those obtained during the race.

Otherwise, during a step 326, the means for determining the aggregate visual signature 222 supply this aggregate visual signature $S_A$ to the name recovery means 216.

During a step 328, the person in the tracklet T is identified from the aggregate visual signature $S_A$. To do this, the name recovery means 216 determine, from the numbers N° predefined in the database 214, the one associated with one or more reference visual signatures $S_R$ having a distance with the aggregate visual signature $S_A$ below a predefined threshold and recover the name of the person N associated with this number N°. In the event that a number N° is associated with several reference visual signatures $S_R$, the distance of the aggregate visual signature $S_A$ in relation to these reference visual signatures $S_R$ is for example an average of the respective distances between the aggregate visual signature $S_A$ and the reference visual signatures $S_R$. Thus, if the number N° is associated with two reference visual signatures $S_R$, the distance of the aggregate visual signature $S_A$ in relation to these two reference visual signatures $S_R$ is an average of the distance of the aggregate visual signature $S_A$ to the first reference visual signature $S_R$ and of the distance of the aggregate visual signature $S_A$ to the second reference visual signature $S_R$. If a number N° is found, the means for determining the aggregate visual signature 222 record the aggregate visual signature $S_A$ in the database 214 and associate it with the name of the person N (and with the associated number N°) recovered by the name recovery means 216.

In parallel to steps 310 to 316 and to steps 318 to 328, the following steps 330 to 334 are implemented.

During a step 330, the line selection means 226 receive, with the video stream F received, an identifier ID of the camera 110 sending this video stream F and select the line L representing the crossing line 104 associated with the camera 110 having this identifier ID.

FIG. 9 shows, in the scope of the example developed, three lines $L_1$, $L_2$, $L_3$ respectively associated with three cameras 110. In this example, the line selection means 226 select the line $L_3$.

Back to FIG. 3, during a step 332, the crossing detection means 228 determine, from the person zones ZP in each tracklet T, the zone first crossing, in a predefined direction, the line L selected, i.e. the zone for which the position occupied is crossed first by the line L, whereas the position occupied by the person zone of the previous image ZP in the tracklet was (entirely) on a predefined side of the line L (for example on the upstream side of the line L).

Referring to FIG. 10, in the example developed, for the second participant 1062, the person zone $ZP_{22}$ of the image 12 is the first to cross the line $L_3$ selected. More specifically, the person zone $ZP_{21}$ of the image 11 is (entirely) in the upstream part of the image 11 whereas a portion of the person zone $ZP_{22}$ of the image 12 is in the downstream part of the image 12.

Back to FIG. 3, during a step 334, the crossing detection means 228 determine a moment D at which the line L is crossed from a moment associated with the image I containing the person zone ZP crossing the line first. The moment of crossing D could further be determined from a moment associated with the previous image.

In the example developed, the moment of crossing D is also taken as the moment of conversion of the image 12 in step 304. Alternatively, the moment of crossing D could be an intermediate moment between the moment associated with the image 12 and the moment associated with the image 11.

During a step 336, the image modification means 230 add the name N supplied by the name recovery means 216 and the moment of crossing D supplied by the crossing detection means 228 in at least some of the images I containing the person zones ZP forming the tracklet T from which this name N and this moment of crossing D have been determined.

The two modified images I*$_1$, I*$_2$ obtained in step 336 in the example developed are shown in FIG. 11.

During a step 338, the video stream reconstruction means 232 construct a reconstructed video stream F* from images I* modified by the image modification means 230 and from unmodified images I from the original video stream F.

It is clear that a method such as the one described above makes it possible to monitor the crossing of a line by people.

Moreover, it will be understood that each of the elements 202 to 232 described previously may be implemented using hardware, for example by microprogrammed or microcabled functions in dedicated integrated circuits (without a computer program), and/or using software, for example by one or more computer programs intended to be executed by one or more computers each comprising, on the one hand, one or more memories for storing data files and one or more of these computer programs and, on the other hand, one or more processors associated with this or these memories and intended to execute the instructions of the computer program or programs stored in the memory or memories of this computer.

It should also be noted that the invention is not limited to the embodiments described above. It will indeed become evident to the person skilled in the art that various modifications can be made to the embodiment described above, in light of the findings that have just been disclosed to him/her.

For example, the elements 202 to 232 could be distributed between several computers. They could even be replicated in these computers. For example, provision could be made for a computer for each camera. In this case, each computer would repeat the elements of the device 112, except the inputting of an identifier ID of the camera and the line selection means 226, which would be unnecessary as this computer would only consider the line associated with the camera to which it is connected. In this case, the different computers are preferably synchronized with one another in order that they determine consistent crossing times between one camera and another. The NTP (Network Time Protocol) is used for example.

In the detailed presentation of the invention that is made above, the terms used shall not be interpreted as limiting the invention to the embodiment set out in this description, but shall be interpreted to include all the equivalents whose prediction is within the grasp of the person skilled in the art by applying his/her general knowledge to the implementation of the findings that have just been disclosed to him/her.

What is claimed is:

1. A method for video surveillance of a crossing of a line by people, the method comprising:
   for each image of a plurality of successive images of a video stream from a camera pointing towards the line, a search for at least one person present in the each image and a definition, for each person found of the at least one person present, of a zone in the each image, wherein said zone is a person zone, surrounding said each person found at least partially;
   for said each person found of at least one person found, a grouping together into one tracklet of several person zones from successive images and surrounding said each person found at least partially;
   for each tracklet:
      identification of the each person found in the tracklet from said several person zones in the tracklet;
      determination of a moment at which the line is crossed by the each person found that is identified from the several person zones in the tracklet,
         wherein the line comprises a fixed and predefined position in the successive images,
         wherein the line is divided into two parts comprising an upstream part and a downstream part,
         wherein said determination of the moment at which the line is crossed by the each person found comprises a determination of when the person zone of the each person found extends at least partly into the downstream part, such that all other person zones of the several person zones extend into the upstream part; and
      addition of a name found and of the moment of crossing determined in at least some of the successive images containing the several person zones in the tracklet.

2. The method according to claim 1, wherein the identification of the each person found comprises:
   for each person zone of the several person zones in the tracklet, determination of a visual signature of the each person found, wherein said visual signature is a local visual signature;
   determination of an aggregate visual signature of the each person found from local visual signatures;
   search for an identification number in the several person zones;
   if the identification number is not found, a search, from identification numbers each associated with one or more reference visual signatures, for the visual signature or visual signatures associated that comprise a smallest distance with the aggregate visual signature; and
   if the identification number is found, association of the aggregate visual signature with the identification number that is found, in order to become a reference visual signature.

3. The method according to claim 2, wherein the aggregate visual signature is an average of the local visual signatures.

4. The method according to claim 2, further comprising, for said determination of said local visual signature for said each person found, an assessment of a reliability of said local visual signature and wherein the aggregate visual signature is determined from, in addition to local visual signatures, their associated reliabilities.

5. The method according to claim 2, wherein a distance of the aggregate visual signature in relation to several reference visual signatures is an average of a respective distances between the aggregate visual signature and the several reference visual signatures.

6. The method according to claim 2, wherein the search for the identification number comprises:
   for each person zone in the tracklet, searching for at least one number present in the each person zone and defining, in the each person zone, for each number found, a number zone surrounding said each number found;

for said number zone of said each person zone in the tracklet, recognition of the at least one number present in the number zone and, for each number of the at least one number that is recognized, an assessment of a reliability of the recognition;

selecting one number of the at least one number that is recognized from the reliability of said each number of the at least one number that is recognized; and searching for the one number that is selected among predefined identification numbers.

7. The method according to claim 6, wherein the selecting of said one number of the at least one number that is recognized from the reliability of said each number of the at least one number that is recognized comprises:

filtering each number of the at least one number for which the reliability is below a predefined threshold; and selecting one other number of the other numbers of the at least one number, wherein said other numbers comprise reliable numbers, from their associated reliabilities.

8. The method according to claim 1, wherein the determination of the moment at which the line is crossed comprises:

determination, from the several person zones in the tracklet, of one first crossing, in a predefined direction, a line with a fixed and predefined position in the successive images; and determination of a moment at which the line is crossed from a moment associated with an image containing the person zone crossing the line first.

9. A non-transitory computer readable medium comprising a program including instructions for execution of a method for video surveillance of a crossing of a line by people, when said program is executed on a computer;

wherein said method comprises for each image of a plurality of successive images of a video stream from a camera pointing towards the line, a search for at least one person present in the each image and a definition, for each person found of the at least one person present, of a zone in the each image, wherein said zone is a person zone, surrounding said each person found at least partially;

for said each person found of at least one person found, a grouping together into one tracklet of several person zones from successive images and surrounding said each person found at least partially;

for each tracklet:

identification of the each person found in the tracklet from said several person zones in the tracklet;

determination of a moment at which the line is crossed by the each person found that is identified from the several person zones in the tracklet, wherein the line comprises a fixed and predefined position in the successive images, wherein the line is divided into two parts comprising an upstream part and a downstream part, wherein said determination of the moment at which the line is crossed by the each person found comprises a determination of when the person zone of the each person found extends at least partly into the downstream part, such that all other person zones of the several person zones extend into the upstream part; and addition of a name found and of the moment of crossing determined in at least some of the successive images containing the several person zones in the tracklet.

10. A device for a video surveillance of a crossing of a line by people, comprising:

means designed, for each image of a plurality of successive images of a video stream from a camera pointing towards the line, to search for at least one person present in the each image and to define, for each person found, a zone in the image surrounding said each person found at least partially, wherein said zone comprises a person zone;

means designed, for said each person found of at least one person found, to group together into one tracklet several person zones from successive images and surrounding said each person found at least partially;

means designed, for said tracklet, to identify the each person found in the tracklet from said several person zones in the tracklet;

means designed, for tracklet, to determine a moment at which the line is crossed by the each person found that is identified from said several person zones in the tracklet, wherein the line comprises a fixed and predefined position in the successive images, wherein the line is divided into two parts comprising an upstream part and a downstream part, wherein said determine the moment at which the line is crossed by the each person found comprises a determination of when the person zone of the each person found extends at least partly into the downstream part, such that all other person zones of the several person zones extend into the upstream part; and means designed, for said tracklet, to add a name found and the moment at which the line is crossed determined in at least some of the successive images containing the several person zones in the tracklet.

\* \* \* \* \*